US008434534B2

(12) United States Patent
Barton (10) Patent No.: US 8,434,534 B2
(45) Date of Patent: May 7, 2013

(54) TIRE HAVING SIDEWALL PROTECTION (75) Inventor: Christopher B. Barton, Clermont Ferrand (FR)

(73) Assignee: Michelin Recherche et Technique, Granges-Paccot (CH)

( * ) Notice: Subject to any disclaimer, the term of this patent is extended or adjusted under 35 U.S.C. 154(b) by 300 days.

(21) Appl. No.: 12/674,744

(22) PCT Filed: Aug. 24, 2007

(86) PCT No.: PCT/US2007/076730
§ 371 (c)(1),
(2), (4) Date: Feb. 23, 2010

(87) PCT Pub. No.: WO2009/029088
PCT Pub. Date: Mar. 5, 2009

(65) Prior Publication Data
US 2011/0126950 A1 Jun. 2, 2011

(51) Int. Cl.
*B60C 11/01* (2006.01)
*B60C 13/00* (2006.01)
(52) U.S. Cl. ............... 152/209.16; 152/209.18; 152/523
(58) Field of Classification Search ............. 152/209.15, 152/209.16, 209.18, 209.24, 523; D12/506, D12/534, 569, 605
See application file for complete search history.

(56) References Cited

U.S. PATENT DOCUMENTS

| 1,505,233 | A | * | 8/1924 | Wolfe | 152/209.16 |
| D92,281 | S | | 5/1934 | Anderson | |
| D167,381 | S | | 7/1952 | Thaden | |
| 3,482,616 | A | * | 12/1969 | French | 152/209.16 |
| 4,055,209 | A | * | 10/1977 | Senger | 152/209.16 |
| 4,617,976 | A | | 10/1986 | Kawajiri | |
| 4,723,585 | A | * | 2/1988 | Mechtel | 152/209.16 |
| D308,038 | S | | 5/1990 | Guidry | |
| 4,982,773 | A | | 1/1991 | Bonko | |
| 5,957,180 | A | * | 9/1999 | Kuramochi et al. | 152/209.21 |
| 6,189,586 | B1 | | 2/2001 | Guidry | |
| 6,250,353 | B1 | | 6/2001 | Maxwell | |
| 6,533,007 | B1 | | 3/2003 | McMannis | |
| D483,718 | S | * | 12/2003 | Hutz et al. | D12/579 |
| 6,761,198 | B2 | | 7/2004 | Zanzig et al. | |
| 6,838,511 | B2 | | 1/2005 | Zanzig | |
| 6,920,906 | B2 | | 7/2005 | Allison et al. | |
| D512,369 | S | * | 12/2005 | Lo | D12/566 |

(Continued)

FOREIGN PATENT DOCUMENTS

GB 178 496 A 4/1922

(Continued)

OTHER PUBLICATIONS

English machine translation, JP2003-313206, dated Nov. 2000.*

(Continued)

*Primary Examiner* — Steven D Maki
*Assistant Examiner* — Robert Dye
(74) *Attorney, Agent, or Firm* — Bruce D. Gray; Kurt J. Fugman (57) ABSTRACT

A tire suitable for off road use has blocks on its sidewalls that add thickness to the sidewall for added protection from debris tending to puncture the sidewalls. The blocks have sloping surfaces that protect the blocks from snagging or tearing from the sidewall. The blocks have surfaces designed to grip sides of ruts and are arranged in concentric patterns with overlapping for greater traction and good weight distribution when running at zero pressure.

17 Claims, 7 Drawing Sheets

U.S. PATENT DOCUMENTS

| | | | |
|---|---|---|---|
| 7,048,022 B2 | 5/2006 | Rooney et al. | |
| D530,266 S * | 10/2006 | Hutz et al. | D12/579 |
| 2008/0210355 A1* | 9/2008 | Harvey et al. | 152/209.8 |

FOREIGN PATENT DOCUMENTS

| | | | |
|---|---|---|---|
| JP | 2000-313206 | * | 11/2000 |
| JP | 2004 291936 A | | 10/2004 |
| JP | 2004-291937 | * | 10/2004 |
| JP | 2004-291938 | * | 10/2004 |
| RU | 2106977 | * | 3/1998 |

OTHER PUBLICATIONS

English machine translation, JP2004-291936, dated Oct. 2004.*

English machine translation, JP2004-291937, dated Oct. 2004.*

Supplementary European Search Report, EP 07 84 1324, dated Aug. 31, 2010.

International Search Report with Written Opinion, mailed Mar. 28, 2008 for PCT/US07/76730 filed Aug. 24, 2007.

* cited by examiner

TIRE HAVING SIDEWALL PROTECTION

BACKGROUND

The present invention relates to the inclusion of block structures on the sidewalls of a tire. More specifically, the present invention relates to block structures located around the circumference of the sidewalls of a tire that protect the sidewall from cuts and punctures, improve run-flat performance, and generate additional soft soil traction.

U.S. Pat. No. 6,533,007 to McMannis ("McMannis") discloses off-road tires having sidewall tread element extensions with steps that provide gripping action and support around the sidewall. McMannis further contemplates the tires climbing the sides of rocks and ruts. The sidewall extensions have outer surfaces that extend along the tire sidewalls and have depressions therein that open inwardly in a direction away from the tread centerline.

U.S. Pat. No. 7,048,022 to Rooney et al. ("Rooney") discloses tire treads with anti-puncture pads for the outer regions and upper sidewalls of a tire. Such treads are defined as having a central tread width that is divided into a central tread zone and opposing lateral tread zones. The lateral tread zones are protected by elongated pads which extend from between a pair of tread elements and into a shoulder region of the tire.

SUMMARY OF THE INVENTION

The present invention discloses a tire having a tread at its radial extremity and a sidewall extending radially from each of the axially opposite edges of the tread toward the axis of the tire. The sidewall includes a first series of blocks fixed to each of the sidewalls at spaced circumferential intervals defining a first ring in concentric relation to the tire and a second series of blocks fixed to each of the sidewalls at spaced circumferential intervals defining a second ring in concentric relation to the tire. The second series of blocks have a radius smaller than the first ring and are in staggered circumferential relation and in radially overlapping relation to the blocks of the first ring. Each of the blocks house a base fixed to its associated side wall, a top, a first pair of circumferentially spaced and axially extending side surfaces between the base and top and a second pair of radially spaced and axially extending side surfaces between the base and the top. The second pair of side surfaces axially extend from the base at an acute angle thereby providing first sloping surfaces.

BRIEF DESCRIPTION OF THE DRAWINGS

Several embodiments of the invention are illustrated in the drawings in which.

DETAILED DESCRIPTION

In accordance with this invention it has been found that block structures of the present invention disposed on the sidewalls of a tire provides protection for the tire casing from aggressive objects, improves soft soil traction, limits snagging or tearing of the blocks from the sidewall, and reduces curvature of the casing ply when the tire is run at low pressures. Further advantages and features will become evident from the following description given with reference to the various figures, which are for purposes of illustrating preferred embodiments of the invention only and should not be construed as limiting the invention.

Figure 6:
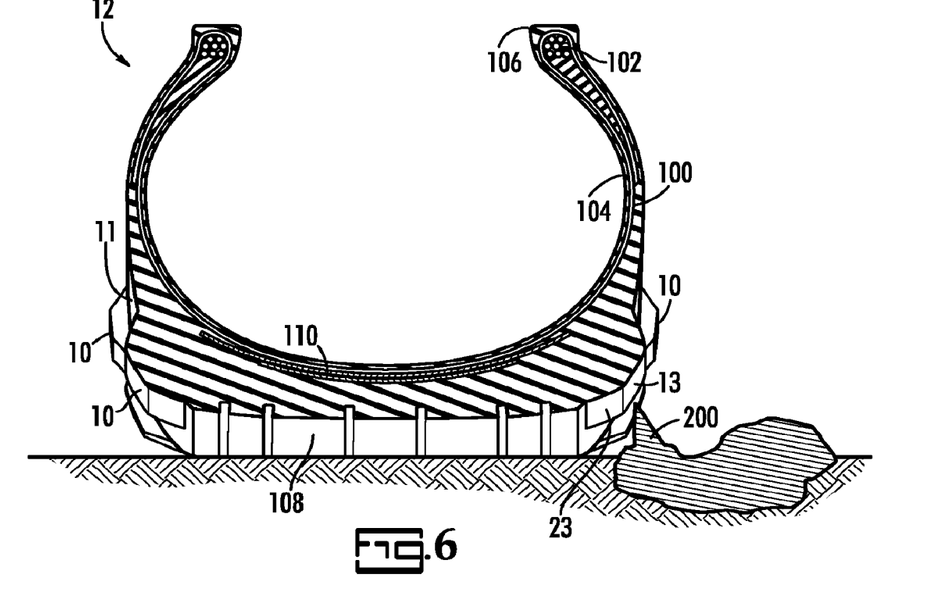
FIG. 6 shows a tire approaching a road hazard.

Referring to FIG. 6 of the drawings, a tire 12 of the present invention is illustrated. The tire 12 is typically a standard radial tire or radial-ply tire made of rubber and other materials; however, other types of tires such as bias ply tires are also considered within the scope of the present invention. As shown in FIG. 6, tire 12 generally includes a casing ply 100, which refers to the network of cords that provide strength and shape to the tire. The casing ply 100 extends between and is turned up and around a pair of opposing beads 102. When radial tires are considered, the network of cords making up the casing ply 100 all lay at approximately a ninety degree angle to the direction of travel. Further, the casing ply 100 is positioned radially outward of an inner liner 104 that extends between opposing bead toes 106. Radially outward of the casing ply 100 and inward of a central tread region 108 is a belt structure 110 comprising multiple plies of reinforcing cords. The casing ply 100 in the sidewalls of the tire allows the tire to act like a spring, giving flexibility and ride comfort. Further, the belt structure 110 reinforces central tread region 108, providing better mileage and performance.

Because the casing ply 100 functions to increase the strength and shape of the tire and provides flexibility and ride comfort, protection of the casing ply 100 is important. This is especially important in off road travels wherein sharp objects are likely to puncture the tire and deteriorate the tire casing ply 100 thereby shortening the lifespan of the tire.

Figure 1:
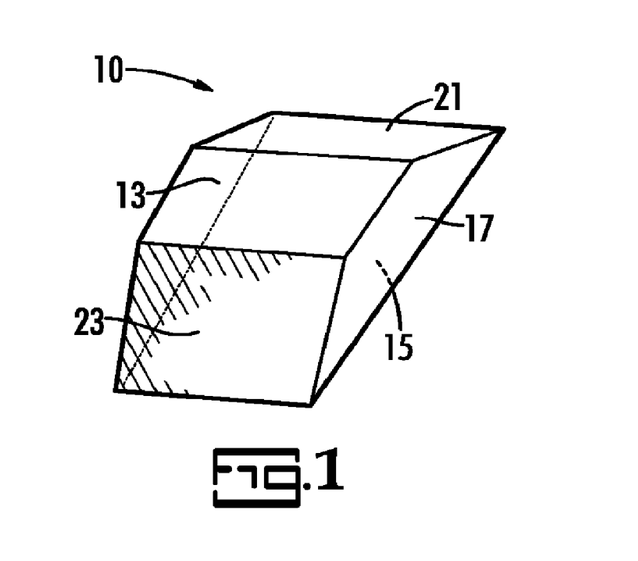
FIG. 1 is a perspective view of one embodiment of a block component of the invention.
Figure 2:
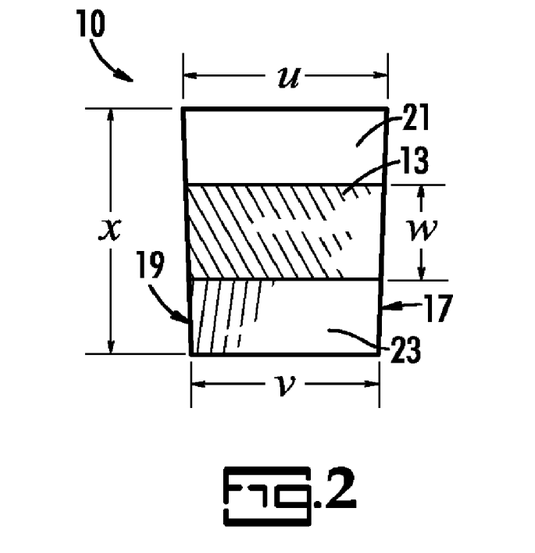
FIG. 2 is a top view of the block shown in FIG. 1.
Figure 3:
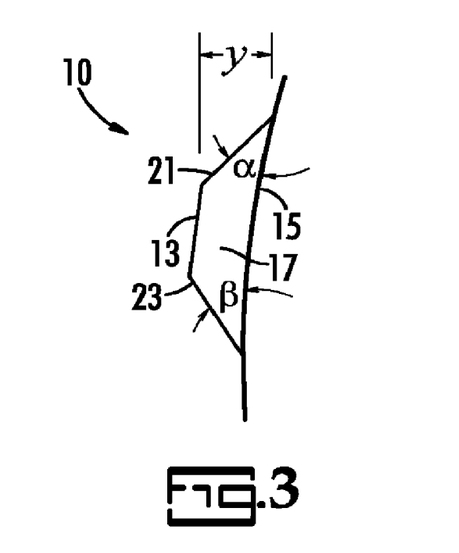
FIG. 3 is a side view of the block shown in FIG. 2.
Figure 4:
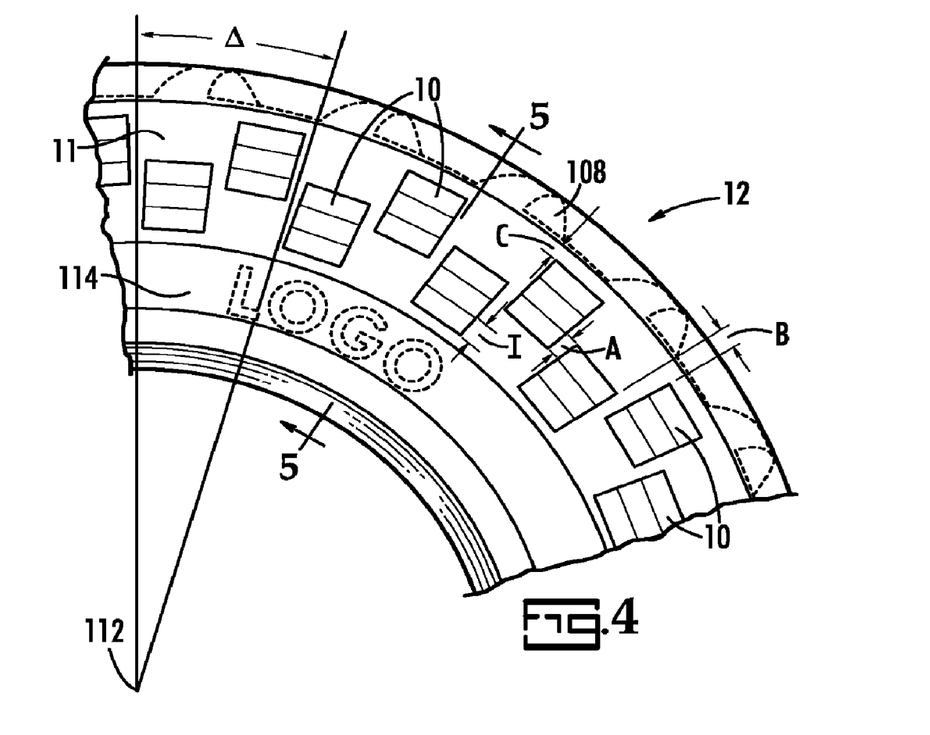
FIG. 4 is a partial side view of a tire having two rows of blocks fixed onto its sidewall.
Figure 5:
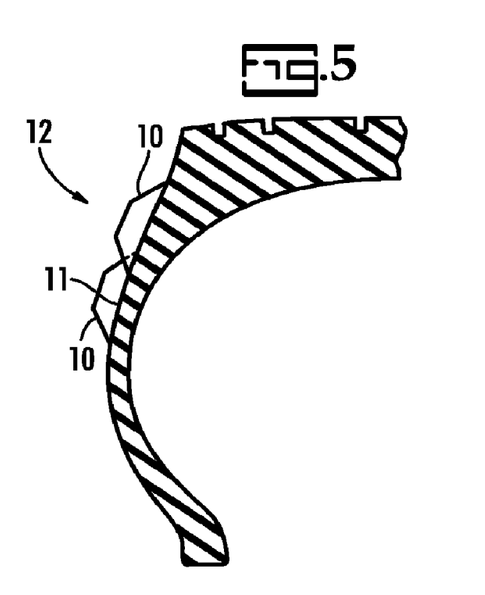
FIG. 5 is a section taken on line 5-5 in FIG. 4.

FIGS. 1 through 3 illustrate one embodiment of a block structure 10 used in the present invention. As shown in FIG. 4, block structures 10 are formed on the opposite sidewalls 11 of tire 12 at equally spaced circumferential intervals in concentric patterns around the sidewall 11 of tire 12. The block structures 10 project outwardly from the sidewall 11 of the tire 12 as shown in FIG. 5, which is a section taken on line 5-5 in FIG. 4. Among the embodiments discussed below, the shape of the block structure 10 on the sidewall 11 of a tire 12 provides the ultimate in soft soil traction. Further, the shape and pattern of the block structures 10 on the sidewall 11 of tire 12 also protect the sidewall from aggressive objects that would otherwise snag or tear the blocks and reduce curvature of the casing ply when the tire is run at low pressures, respectively.

The embodiment of the blocks represented in FIGS. 1-5 each have, generally, six main surfaces which together form a three dimensional trapezoidal structure. Four of the six surfaces are shown in FIG. 1. The first surface, which is the top surface, or face 13 of the block structure 10, is generally parallel to the sidewall 11 of the tire 12.

The second surface, which is the bottom surface, or base 15 of the block 10, generally follows the curvature of the tire sidewall 11 and is fixed thereto. In one embodiment, the base 15 is formed with the sidewall 11 of the tire 12. In another embodiment, the second surface or base 15 is affixed to the sidewall 11 of the tire 12. In yet another embodiment, the second surface or base 15 is affixed to the sidewall 11 after the sidewall 11 has been formed.

Both the first and second surfaces 13, 15 are typically quadrilateral, such as rectangular or trapezoidal in shape. In one embodiment, such as shown in FIG. 2, two parallel sides of the rectangular face 13 have a width "w" which is less than the width "x" between two common parallel sides of the base 15.

The third and fourth surfaces, 17, 19 of the block 10 are generally perpendicular to the sidewall 11 of the tire 12, which is the direction of slip relative to the soil and therefore provides added traction when used in off road travels such as through soft-soil mud or sand. Each of the third and fourth surfaces 17, 19 share at least one common side with the face 13 and the base 15. As shown in the embodiment of FIG. 1, the third and fourth surfaces 17, 19 typically form a trapezoidal shape wherein the smaller length "w" of the trapezoidal shape is common with the face 13 of the block 10, and the greater length "x" of the trapezoidal shape is common with the base 15 of block 10. The length "x" is also the overall length of the block 10 of the embodiment shown in FIGS. 1-5. The length "x" is preferably large enough to provide adequate area to support traction by the block 10 but small enough to preferably allow at least two rings of blocks 10 in the upper sidewall. In one embodiment wherein the tire is a 1200R20 size tire, which is merely the example tire used for the measurements provided herein, length "x" is approximately 61 mm.

The height "y" of the third and fourth surfaces 17, 19 that forms a trapezoidal shape, which is also the distance from the base 15 to the face 13 of the block 10, is preferably approximately 10 mm. Typically height "y" is high enough to provide adequate area to support traction by the block 10 and protect the sidewalls from punctures. It is further preferable that height "y" not extend to a height which causes unnecessary exposure to snagging by road hazards, such as objects in mud or sand, or adds excessive volume to the rubber of the sidewall 11 of the tire 12. The height "y" typically depends upon the height or size of the tire.

The fifth and sixth surfaces, 21, 23 of the block 10 create an incline or outward angled slope from the base 15 of the block 10 to the face 13 of the block 10. As shown in FIGS. 4 and 5, the outward angled slope of the fifth and sixth surfaces 21, 23 is in the radial direction. Because of the path of the majority of road-hazards against the sidewall, having the outward angled slopes of the fifth and sixth surfaces 21, 23 in the radial direction prevents objects such as road hazards from snagging or tearing the blocks 10 off of the tire sidewalls. Further, because the blocks 10 are better secured to the sidewall, the thickness of the blocks better protects the tire sidewall and casing from punctures by road hazards. As shown in FIG. 3, the outward angle "α", which is the outward angle of the fifth surface 21 from the base 15, is preferably between 20 and 40 degrees. In one embodiment the outward angle "α" is approximately 25 degrees. The angle "α" however, may be anywhere between greater than 0 degrees and 90 degrees. It is further preferred that the angle "α" be as small as possible to keep the block from snagging on objects but large enough to allow adequate block height to protect the sidewall and to provide enough area to create the greatest support block traction. To keep the blocks from snagging on objects, the angle "α" is preferably less than 45 degrees. The angle "β", which is the outward angle of the sixth surface 23 from the base 15 of the block 10 to the face 13 of the block 10, also may be any angle between greater than 0 degrees and 90 degrees. Similar to angle "α", angle "β" is preferably between 20 and 40 degrees. In one embodiment the outward angle "β" is approximately 25 degrees. It is preferred that angle "β" be as small as possible to keep the block from snagging on objects but large enough to allow adequate block height to protect the sidewall and to provide enough area to create the greatest support block traction. To keep the blocks from snagging on objects, the angle "β" is preferably less than 45 degrees. Preferably, angles "α" and "β" are relatively equivalent; however, angles "α" and "β" may vastly differ without departing from the spirit and the scope of the invention.

As shown in FIG. 2, the fifth surface 21 has a width "u". The width "u" is typically equal to or slightly less than the length "x" of the block 10. It is preferred that the width "u" of the fifth surface 21 is sufficiently wide to provide adequate rigidity to the block 10 in the circumferential direction of the tire 12. Further as shown in FIG. 2, the sixth surface 23 has a width "v". The width "v" may be equal to the width "u" of the fifth surface 21, but the width "v" may be less than the width "u" of the fifth surface 21 to allow the block 10 to taper in the radial direction of the tire 12. Similar to the width "u" of the fifth surface 21, it is preferred that the width "v" of the sixth surface 23 is sufficiently wide to provide adequate rigidity to the block 10 in the circumferential direction of the tire 12.

FIGS. 4 and 5, show two circumferential rows or rings of blocks 10 on the sidewall 11 of the tire 12. In the embodiment shown, each circumferential ring of blocks 10 have blocks 10 that are equally spaced circumferentially. The blocks of each ring of blocks does not have to be equally spaced circumferentially without departing from the spirit and scope of the invention. Further, each ring of blocks 10 has a different radii from the rotational center 112 of the tire 12 thereby causing the blocks 10 to be offset in the radial direction. This radial offset creates the two separate circumferential rings of blocks 10 that extend circumferentially around the sidewall 11 of the tire 12. More than two rings of blocks may be used depending upon the size of the tire sidewall and the size of the particular blocks. Offsetting the two circumferential rings of blocks 10 radially provides better sideway gripping in ruts and better sidewall support when running flat or at low pressures.

For example, spaces or voids are created between the radially offset blocks 10 that allow mud or slush in ruts to build up in front of the block 10 in the circumferential direction when traversing unimproved roads. The distance "B" between the blocks 10 is not limited; however, the distance is preferably between 1 mm and 5 mm. It is also preferred that distance "B" be as small as possible so that more blocks can be formed on the tire sidewall.

Offsetting and overlapping the blocks also improves sidewall support when the tire runs flat. The blocks 10 add thickness to the sidewall of the tire. When the blocks 10 are offset and overlap, the added thickness reduces curvature of the casing ply if there is a flat tire having zero pressure or near zero pressure rolling. If the blocks 10 do not overlap, the casing ply fatigues more quickly because the curvature concentrates between the blocks 10.

In FIG. 4, the blocks 10 are offset and overlap radially a distance "A". Because the blocks 10 overlap, the distance "A" is greater than zero. In one example as shown in FIG. 4, the first and second rings of blocks 10 have similar dimensions so that dimension "l", the length of the incline of the fifth or sixth surfaces 21, 23 from the base 15 to the face 13, is the same for all of the blocks 10. The distance "A", as shown in FIG. 4, is the same as the length of the incline "I" of the block 10. It is preferred that the distance "A" is large enough to reduce curvature of the casing ply during run flats. In one embodiment, the distance "A" and the distance "I" are both approximately 30 mm. In another embodiment, the distance "A" is approximately 20 mm and the distance "I" is approximately 30 mm. In yet another embodiment, the distance "A" is approximately 30 mm and the distance "I" is approximately 20 mm.

Figure 7:
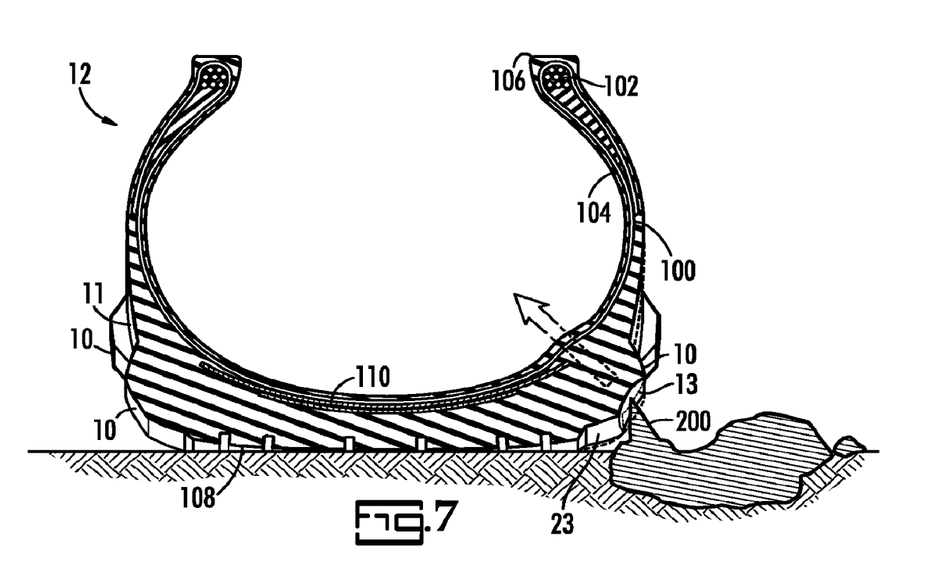
FIG. 7 shows the block of this invention and the sidewall being deflected by the road hazard.

FIGS. 6 and 7 illustrate an example of the sidewall blocks functioning to protect the sidewall of a tire 12. As shown in FIG. 6, a fixed piece of debris 200 having a sharp edge and located below the tire center gets close to puncturing the sidewall 11 of tire 12. Because the surfaces 21, 23 of the blocks 10 are inclined in the radial direction of the tire, as the tire rotates, the debris 200 contacts and applies pressure to the surface of the block 10 but avoids snagging or tearing off the block 10. Furthermore, the added thickness of the block 10 keeps the debris 200 from directly contacting the sidewall 11, but rather, the debris 200 directly contacts the block 10. The stress created by the debris 200, such as shown by the inward deformation illustrated by the arrow in FIG. 7, is better distributed to the casing ply 200 and the entire tire 12 when the blocks 10 are present as opposed to a tire without sidewall blocks 10. Accordingly, by keeping the debris 200 far away from the casing ply 100, the casing ply 100 is protected and the lifespan of the tire 12 is increased.

Figure 8:
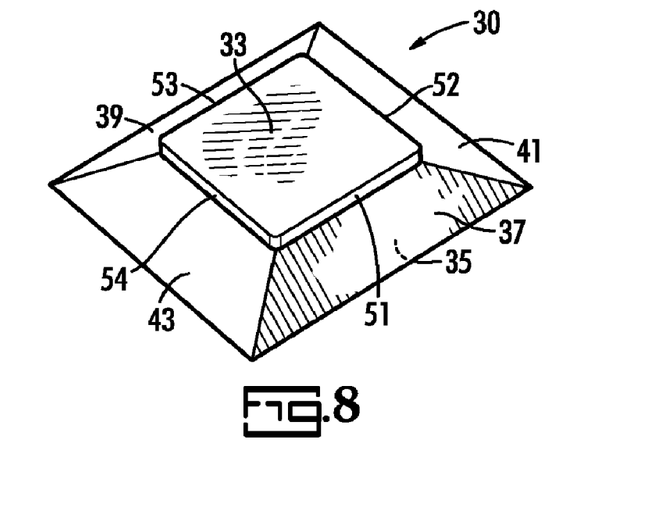
FIG. 8 is a perspective view of a second embodiment block of this invention.
Figure 9:
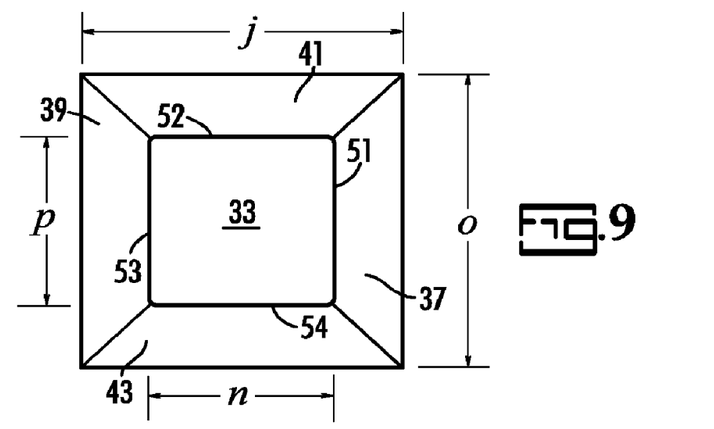
FIG. 9 is a top view of the block shown in FIG. 8.
Figure 10:
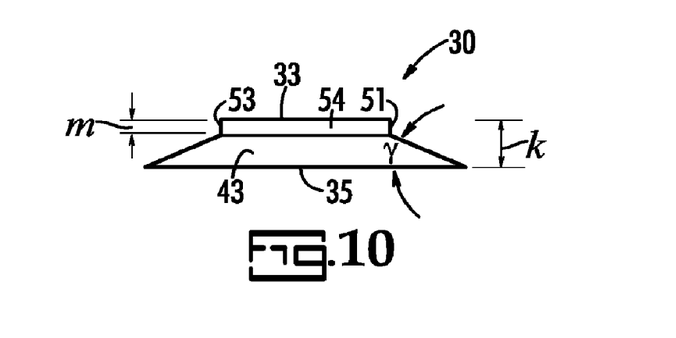
FIG. 10 is a side view of the block shown in FIG. 9.
Figure 11:
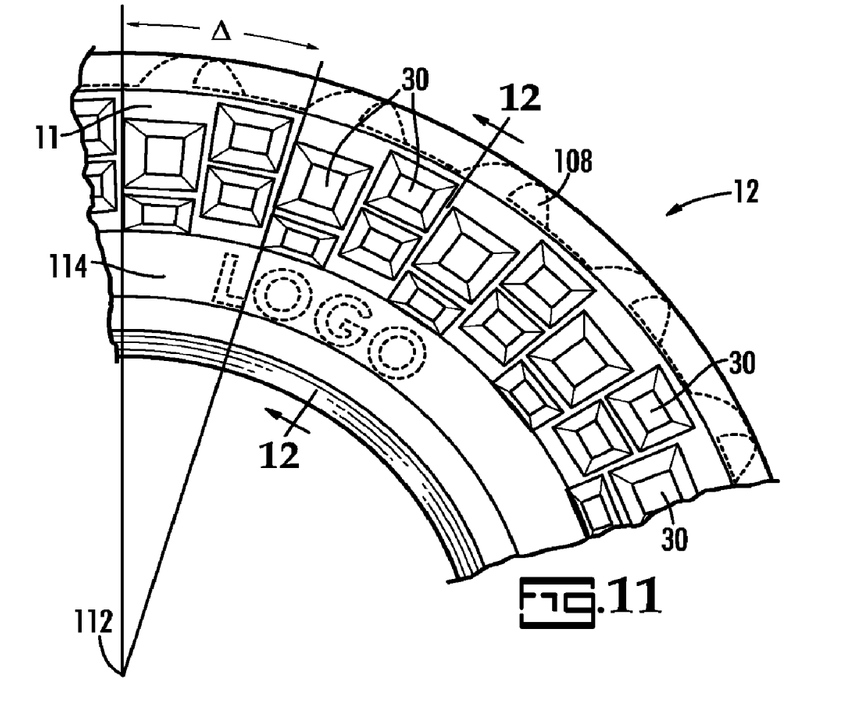
FIG. 11 is a partial side view of a tire side wall with the blocks shown in FIG. 8 installed thereon.
Figure 12:
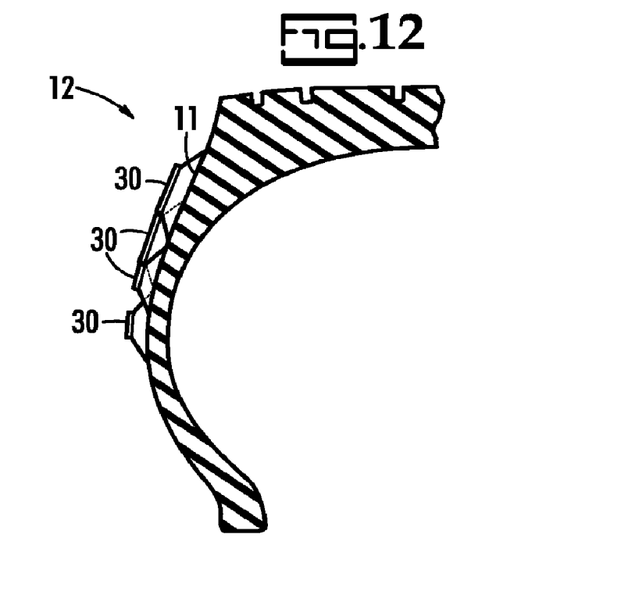
FIG. 12 is a section taken on line 12-12 in FIG. 11.
Figure 13:
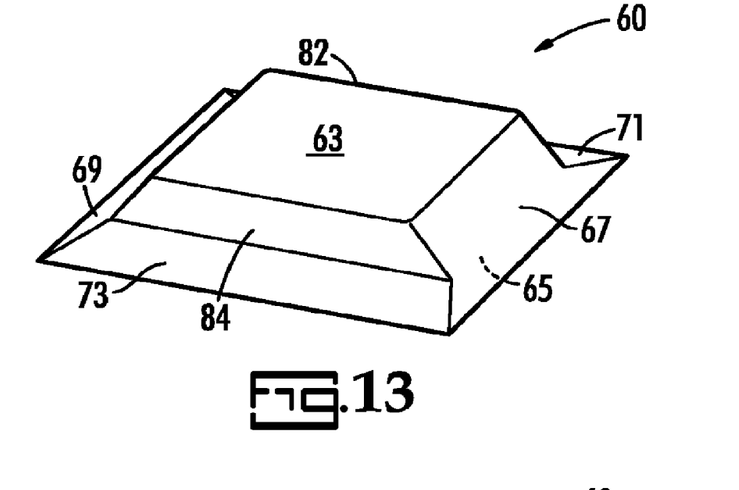
FIG. 13 is a perspective view of a third embodiment of the block of this invention.

FIGS. 8 through 10 illustrate another embodiment of a block structure 30 used in the present invention. As shown in FIG. 11, block structures 30 are formed on the opposite sidewalls 11 of a tire 12 at equally spaced circumferential intervals in concentric patterns around the sidewall 11 of the tire 12. The block structures 30 project outwardly from the sidewall 11 of the tire 12 as shown in FIG. 12, which is a section taken on line 12-12 in FIG. 11. Among the embodiments discussed, the increased number of inclined surfaces of the block structures 30 on the sidewall 11 of a tire 12 generates the ultimate in puncture resistance from aggressive objects that would otherwise snag or tear the blocks off of the sidewall 11. Similar to block 10, the shape and pattern of block structures 30 on the sidewall 11 of a tire 12 also provides additional soft soil traction over tires without blocks on the sidewalls and reduces curvature of the casing ply when the tire is run at low pressures, respectively.

The embodiment of the blocks represented in FIGS. 8-12 each have, generally, six main surfaces which together form a three dimensional truncated pyramidal structure having a top. Five of the six surfaces are shown in FIG. 8. The first surface, which is the top surface, or face 33 of the block structure 30, is generally parallel to the sidewall 11 of the tire 12. The second surface, which is the bottom surface, or base 35 of the block 30, generally follows the curvature of the tire sidewall 11 and is fixed thereto.

Both the first and second surfaces 33, 35 are typically quadrilateral, such as rectangular or trapezoidal in shape. In one embodiment, such as shown in FIG. 9, two parallel circumferentially extending sides of the rectangular shape of the face 33 have a width "n" which is less than the width "j" between two common parallel sides of the base 35. The width "j" is also the overall width of the block 30 of the embodiment shown in FIGS. 8-12. The width "j" is preferably large enough to provide adequate area to support traction by the block 30 but small enough to preferably allow multiple blocks 30 in the circumferential direction of the sidewall 11 of the tire 12. In one embodiment, the width "j" is approximately 30 through 63 mm. Further, in one embodiment, the width "n" is approximately 15 through 30 mm. In yet another embodiment, the width "j" is 61 mm and the width "n" is 30 mm.

As shown in FIG. 9, one embodiment of block 30 has two parallel radially extending sides of the face 33 having a length "p" which is less than the length "o" of two parallel radially extending sides of the base 35. The length "o" is also the overall length of the block 30 of the embodiment shown in FIGS. 8-12. The length "o" is preferably large enough to provide adequate area to support traction by the block 30 but small enough to preferably allow at least two rings of blocks 30 in the radial direction of the sidewall 11 of the tire 12. In one embodiment, the length "o" is approximately 49 through 60 mm. Further, in one embodiment, the length "p" is approximately 15 through 33 mm. In yet another embodiment, the length "o" is 60 mm and the length "p" is 30 mm.

The remaining surfaces, the third, fourth, fifth, and sixth surfaces, 37, 39, 41, 43, respectively, of the block 30 create an outward angled slope from the base 35 of the block 30 to the face 33 of the block 30. Having the third, fourth, fifth, and sixth surfaces 37, 39, 41, 43 all create an outwardly angled slope from the base 35 to the face 33 of block 30 greatly reduces potential cracks in the sidewall from the harsh transition between the sidewall 11 and the third, fourth, fifth, and sixth surfaces 17, 19, 21, 23 of the block 10. Furthermore, by eliminating the harsh transition, the block 30 is protected from being torn off or snagged by road hazards. Because the blocks 10 are better secured to the sidewall, the thickness of the blocks protects the tire sidewall and casing from punctures by road hazards. The third and fourth surfaces 37, 39 typically form a trapezoidal shape wherein the smaller length "p" of the trapezoidal shape is common with the face 33 of the block 30, and the greater length "o" of the trapezoidal shape is common with the base 35 of block 30. As shown in FIGS. 11 and 12, the outward angled slope of the third and fourth surfaces 37, 39 is in the circumferential direction.

Similar to the third and fourth surfaces 37, 39, the fifth and sixth surfaces 41, 43 typically form a trapezoidal shape wherein the smaller width "n" of the trapezoidal shape is common with the face 33 of the block 30, and the greater width "j" of the trapezoidal shape is common with the base 35 of block 30. As shown in FIGS. 11 and 12, the outward angled slope of the fifth and sixth surfaces 41, 43 is in the radial direction.

As shown in FIG. 11, the length "o" may be greater than, less than or equal to the width "j". It is preferred that the width "j" of the fifth surface 41 is sufficiently wide to provide adequate rigidity to the block 30 in the circumferential direction of the tire 12. While the width of the sixth surface 43 is not identified, it is typically equal to the width "j" of the fifth surface 41; however, the width of the sixth surface 43 may be less than the width "j" to allow the block 30 to taper in the radial direction of the tire 12. It is also preferred that the length "o" of the third surface 37 is sufficiently wide to provide adequate rigidity to the block 30 in the radial direction of the tire 12. While the length of the fourth surface 39 is not identified, it is typically similar or equal to the length "o" of the third surface 37.

As shown in FIG. 10, the third, fourth, fifth, and sixth surfaces 37, 39, 41, 43 extend outwardly from the base 35 to the face 33 a distance "k". In one embodiment, the third, fourth, fifth, and sixth surfaces 37, 39, 41, 43 extend outwardly to a height of approximately 10 mm from the base 35 to the face 33. Typically height "k" is high enough to provide adequate area to support traction by the block 30 and protect the sidewalls from punctures. It is further preferable that height "k" not extend to a height which causes unnecessary exposure to snagging by road hazards, such as objects in the mud or sand, or adds excessive volume to the rubber of the sidewall 11 of the tire 12. The height "k" typically depends upon the height of the tire.

While not individually discussed, each of the third, fourth, fifth, and sixth surfaces 37, 39, 41, 43 have an outward angle slope from the base 35 to the face 33. For example and as shown in FIG. 10, the outward angle "γ", which is the outward angle of the fourth surface 37 from the base 35, is preferably between 25 and 45 degrees. The angle "γ" however, may be anywhere between greater than 0 degrees and 90 degrees. It is further preferred that the angle "γ" be as small as possible to keep the block from snagging on objects but large enough to allow adequate block height to protect the sidewall and to provide enough area to create the greatest support block traction. Generally the outward angles of each of the sloped surfaces 37, 39, 41, 43 are relatively the same; however, they may vastly differ without departing from the scope of the invention.

In the embodiment shown in FIGS. 8-12, the block 30 also includes a cap portion. The cap portion is formed by four side surfaces 51, 52, 53, 54 extending perpendicularly inward from the face 33 and connecting to the third, fifth, fourth, and sixth surfaces respectively. The cap portion would also include face 33. The side surfaces 51, 52, 53, 54 of the cap portion extend inward a height "m" wherein the side surfaces 51, 52, 53, 54 terminate in junctions with the sloping surfaces 37, 41, 39, 43, respectively. In one embodiment, the height "m" of the side surfaces 51, 52, 53, 54 is 3 mm. In another embodiment, the height "m" of the side surfaces 51, 52, 53, 54 is approximately one-fourth the height "k" of the block 30. In yet another embodiment, the cap portion extends at an angle inward relative to the face 33 rather than perpendicular to the face 33. While the cap portion of block 30 is not required but may be used in any embodiment of the present invention, it is a particularly useful feature in the manufacturability and appealability of the tire 12.

FIGS. 11 and 12, show four circumferential rows or rings of blocks 30 on the sidewall 11 of the tire 12. In the embodiment shown, each circumferential ring of blocks 30 are equally spaced circumferentially but each ring has a different radii from the rotational center 112 of the tire 12. Accordingly, the blocks 30 are offset and overlap in the radial direction. This radial offset creates the four separate circumferential rings of blocks 30 that extend circumferentially around the sidewall 11 of the tire 12. More or less than four rings of blocks may be used depending upon the size of the tire sidewall and the size of the particular blocks. In the embodiment shown, several different sizes of blocks are used; however, the blocks may also be the same size. The overlap of the four circumferential offset rings of blocks 30 radially provides better sidewall support when running flat.

Figure 14:
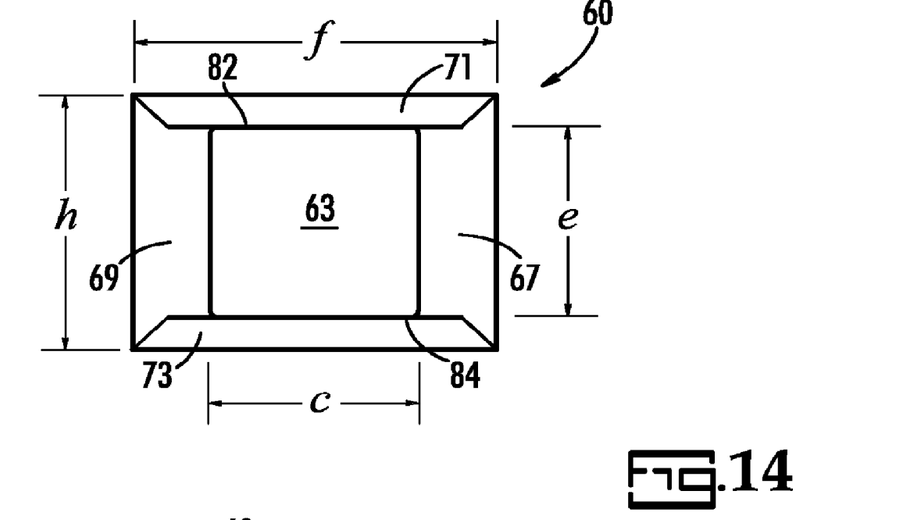
FIG. 14 is a top view of the block shown in FIG. 13.
Figure 15:
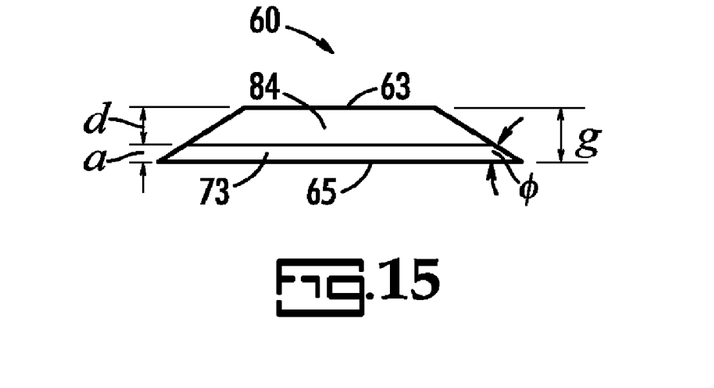
FIG. 15 is a side view of the block shown in FIG. 14.
Figure 16:
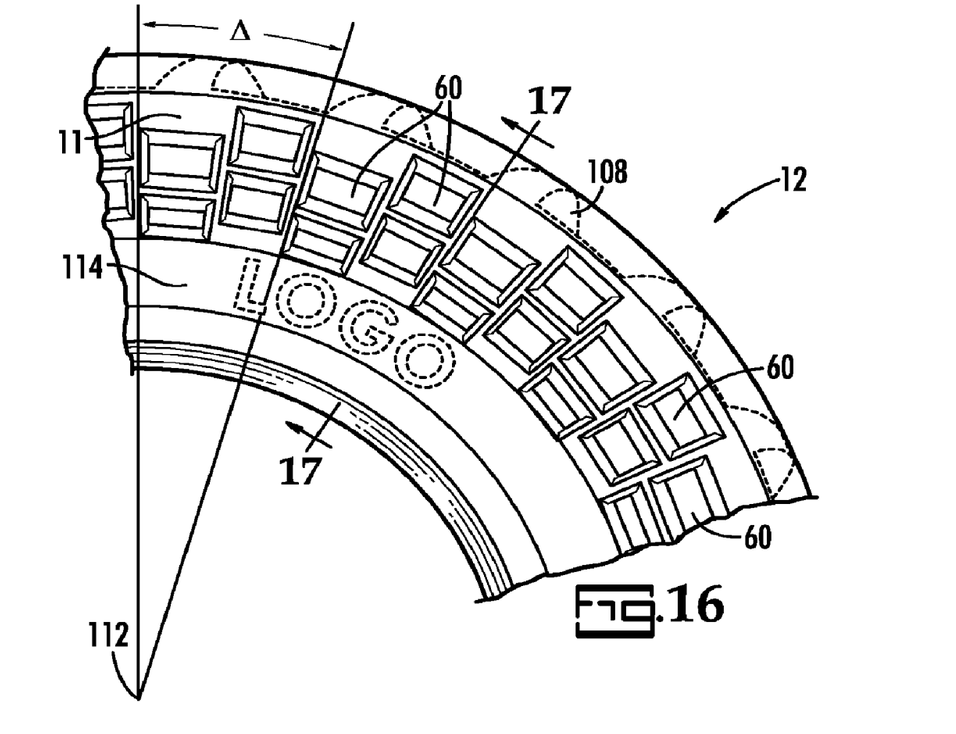
FIG. 16 is a partial side view of a tire sidewall showing four rows of the third embodiment blocks fixed thereto.
Figure 17:
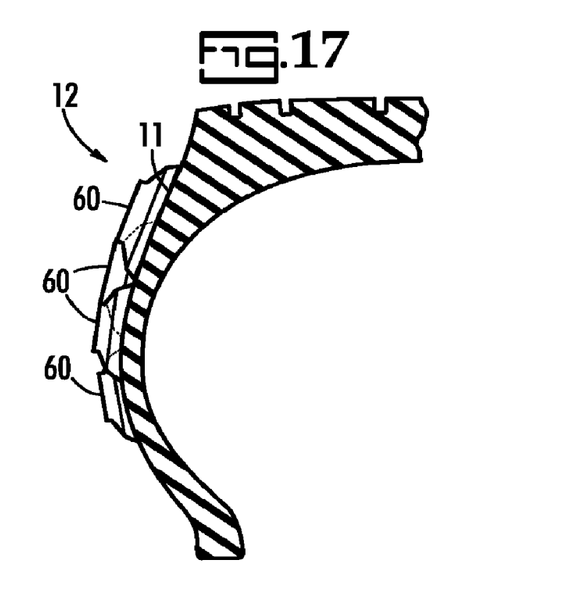
FIG. 17 is a section taken on the line 17-17 in FIG. 16.

FIGS. 13 through 17 illustrate another embodiment of a block structure 60 used in the present invention. As shown in FIG. 16, block structures 60 are formed on the opposite sidewalls 11 of a tire 12 at equally spaced circumferential intervals in concentric patterns around the sidewall 11 of the tire 12. The block structures 60 project outwardly from the sidewall 11 of the tire 12 as shown in FIG. 17, which is a section taken on line 17-17 in FIG. 16. Among the embodiments discussed, the shape of the block structures 60 on the sidewall 11 of a tire 12 generates the ultimate combination of both soft soil traction and sidewall protection from aggressive objects that would otherwise tear the blocks off the sidewall and snag the sidewall or casing ply. Furthermore, the primary pattern contemplated with block structure 60 on the sidewall of a tire reduces curvature of the casing ply when the tire is run at low pressures.

The embodiment of the block 60 represented in FIGS. 13-17 is very similar to the block structure 30 wherein five of the six primary surfaces are shown in FIG. 1. The first surface, which is the top surface, or face 63 of the block 60 is generally parallel to the sidewall 11 of the tire 12. The second surface, which is the bottom surface, or base 65 of the block 60, generally follows the curvature of the tire sidewall 11 and is fixed thereto.

Both the first and second surfaces 63, 65 are typically quadrilateral such as rectangular or trapezoidal in shape. In one embodiment, such as shown in FIG. 14, two parallel circumferentially extending sides of the rectangular shape of the face 63 have a width "c" which is less than the width "f" between two common parallel sides of the base 65. The width "f" is also the overall width of the block 60 of the embodiment shown in FIGS. 13-17. The width "f" is preferably large enough to provide adequate area to support traction by the block 60 but small enough to preferably allow multiple blocks 60 in the circumferential direction of the sidewall 11 of the tire 12. In one embodiment, the width "f" is approximately 30 through 63 mm. Further, in one embodiment, the width "c" is approximately 15 through 30 mm. In yet another embodiment, the width "f" is 60 mm and the width "c" is 30 mm.

As shown in FIG. 14, one embodiment of block 60 also has two parallel radially extending sides of the face 63 having a length "e" which is less than the length "h" of two parallel radially extending sides of the base 65. The length "h" is also the overall length of the block 60 of the embodiment shown in FIGS. 13-17. The length "h" is preferably large enough to provide adequate area to support traction by the block 60 but small enough to preferably allow at least two rings of blocks 60 in the radial direction of the sidewall 11 of the tire 12. In one embodiment, the length "h" is approximately 45 through 60 mm. Further, in one embodiment, the length "c" is approximately 15 through 33 mm. In yet another embodiment, the length "h" is 45 mm and the length "c" is 30 mm.

Like the block 30, the third and fourth surfaces 67, 69 of the block 60 create an outward angled slope from the base 65 of the block 60 to the face 63 of the block 60. The third and fourth surfaces 67, 69 typically form a trapezoidal shape wherein the smaller length "e" of the trapezoidal shape is common with the face 63 of the block 60, and the greater length "h" of the trapezoidal shape is common with the base 65 of block 60. As shown in FIGS. 16 and 17, the outward angled slope of the third and fourth surfaces 67, 69 is in the circumferential direction.

Also similar to the embodiment of the block 30, the fifth and sixth surfaces 71, 73 of the block 60 create an outward angled slope from the base 65 of the block 60; however, the outward angled slope of the fifth and sixth surfaces 71, 73 have less of an outward angled slope than the third and fourth surfaces 67, 69 so that surfaces 71, 73 terminate prior to the face 63. This produces a block 60 with more area in the cap portion, or, if the embodiment has no cap portion, a seventh and eighth surface 82, 84 that extends from the fifth and sixth surfaces 71, 73, respectively, to the face 63. In one embodiment, the seventh and eighth surfaces are perpendicular to the face 63. In another embodiment, the seventh and eighth surfaces 82, 84 are angled outward from the fifth and sixth surfaces 71, 73, respectively, to the face 63.

Similar to the third and fourth surfaces 67, 69, the fifth and sixth surfaces 71, 73 typically form a trapezoidal shape wherein the greater width "f" of the trapezoidal shape is common with the base 65 of block 60; however, as discussed above, the smaller width "b" of the trapezoidal shape is common with the seventh and eighth surface 82, 84 of the block 60. As shown in FIGS. 16 and 17, the outward angled slope of the fifth and sixth surfaces 71, 73 is in the radial direction. Because of the path of the majority of road-hazards against the sidewall, having the outward angled slopes of the fifth and sixth surfaces 71, 73 in the radial direction further prevents objects from snagging or tearing off the blocks 60.

As shown in FIG. 16, the length "h" may be greater than, less than or equal to the width "f". It is preferred that the width "f" of the fifth surface 71 is sufficiently wide to provide adequate rigidity to the block 60 in the circumferential direction of the tire 12. While the width of the sixth surface 63 is not identified, it is typically equal to the width "f" of the fifth surface 71; however, the width of the sixth surface 73 may be less than the width "f" to allow the block 60 to taper in the radial direction of the tire 12. It is also preferred that the length "h" of the fourth surface 69 is sufficiently wide to provide adequate rigidity to the block 60 in the radial direction of the tire 12. While the length of the third surface 67 is not identified, it is typically similar or equal to the length "h" of the fourth surface 69.

As shown in FIG. 15, the third and fourth surfaces 67, 69 extend outwardly from the base 65 to the face 63 a distance "g". In one embodiment, the third and fourth surfaces 67, 69 extend outwardly to a height of approximately 10 mm from the base 65 to the face 63. The height "g" is high enough to provide adequate area to support traction by the block 60 and protect the sidewalls from punctures. It is further preferable that height "g" not extend to a height which causes unnecessary exposure to snagging by road hazards, such as objects in the mud or sand, or adds excessive volume to the rubber of the sidewall 11 of the tire 12. The height "g" is typically dependent upon the height of the tire.

The fifth and sixth surfaces 71, 73 extend outwardly from the base 65 to the seventh and eighth surfaces 82, 84, respectively, a distance "a". In one embodiment, the fifth and sixth surfaces 71, 73 extend outwardly to a height of approximately 3 mm from the base 65 to the seventh and eighth surfaces 82, 84.

As shown in FIG. 15, the outward angle "ϕ" is the outward angle of the sixth surface 73 from the base 65 to the eighth surface 84. It is preferred that the outward angle "ϕ" is approximately 25 degrees. In one preferred embodiment, the fifth and sixth surfaces 71, 73 typically have the same outward angled slope from the base 65 to the seventh and eighth surfaces 82, 84 as the third and fourth surfaces 67, 69. In this preferred embodiment and as shown in FIGS. 13-16, the circumferential distance from each outer edge of surfaces 71, 73 to the common edge of the face 63 is less that the radial distance from each outer edge of surfaces 67, 69 to the common edge of the face 63. In another embodiment, the fifth and sixth surfaces 71, 73 of block 60 have a smaller outward angled slope from the base 65 to the seventh and eighth surfaces 82, 84.

The side surfaces 82, 84 extend inward from the face 63 a height "d" wherein the side surfaces 82, 84 terminate in junctions with the sloping surfaces 71, 73. In one embodiment, the height "d" of the side surfaces 82, 84 is 7 mm.

FIGS. 16 and 17, show four circumferential rows or rings of blocks 60 on the sidewall 11 of the tire 12. In the embodiment shown, each circumferential ring of blocks 60 are equally spaced circumferentially but each offset ring has a different radii from the rotational center 112 of the tire 12. Accordingly, the blocks 60 are offset and overlap in the radial direction. This radial offset creates the four separate circumferential rings of blocks 60 that extend circumferentially around the sidewall 11 of the tire 12. More or less than four rings of blocks may be used depending upon the size of the tire sidewall and the size of the particular blocks. In the embodiment shown, several different sizes of blocks are used; however, the blocks may also be the same size. Offsetting and overlapping the four circumferential rings of blocks 60 radially provides better sideway gripping in ruts and better sidewall support when running flat.

Further, the number of rows may vary depending on the size of the tire or the preferred arrangement or pattern of blocks on the sidewall. As shown in FIGS. 4, 11, and 16, the circumferential distance between a first block in a ring of blocks and a second block in the same ring of block is based on an angle "Δ" measured from the rotational center 112 of the tire 12. This angle "Δ" is typically approximately 16 degrees. In one embodiment, the angle "Δ" is 16.36 degrees.

It is preferred that the blocks are arranged so as to extend between the tread 108 on the outer circumference of the tire 12 to the logo portion 114 on the tire sidewall 11. If no logo is necessary on the tire, the blocks may extend as close as possible to the inner circumference of the tire. The casing ply of the tire, discussed above as providing the primary structural component in the tire sidewall, is protected by having the blocks span more area between the outer and inner circumference of the tire. The blocks may also be arranged to extend into the tread 108 located on the outer circumference and outer surface of the tire. In one embodiment, the blocks are arranged so as to extend from a first sidewall of the tire to the opposite sidewall of the tire, thereby also extending over the outer surface and merged into the tread of the tire. Such a tire would be favored for off-highway use. In another embodiment, such as shown in FIG. 4, the radially outermost circumferential ring of blocks are separated from the central tread portion 108, or a mold joint for the central tread portion 108 of the tire 12, by a distance "C". As previously stated, it is preferred that the distance "C" is minimized by having the blocks in the upper sidewall and proximately close to the central tread portion 108. In one embodiment, the distance "C" is approximately 3-4 mm.

It should be noted that the distances disclosed above are merely for example to obtain perspective and contemplate the preferred distances using a 1200R20 size tire. Other size and types of tires are contemplated with the present invention. In general, and not meant to limit the present invention in any way, the larger the tire, the greater the above distances tend to be.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A tire comprising:
    a tread at a radial extremity of the tire, having axially opposite edges;
    a sidewall extending radially from each of the axially opposite edges of the tread toward an axis of the tire;
    a first series of blocks fixed to each of said sidewalls at spaced circumferential intervals defining a first ring in concentric relation to said tire;
    a second series of blocks fixed to each of said sidewalls at spaced circumferential intervals defining a second ring in concentric relation to said tire and having a radius smaller than a radius of said first ring, each block having a circumferential width,
    wherein said second series of blocks of said second ring are in staggered circumferential relation to said first series of blocks of said first ring, wherein said second series of blocks of said second ring are in radially overlapping and offset relation to said first series of blocks of said first ring, wherein the radial overlap between the blocks is from 20 mm to 30 mm;

wherein the spaced circumferential intervals between said blocks of said first series of blocks is greater than the circumferential width of said blocks of said second series of blocks, so that there exists a circumferential distance "B" between one of said blocks of said first series of blocks and one of said blocks of said second series of blocks in the range of one to five millimeters, such that a space or void is created between radially offset blocks, and whereby sideway gripping in ruts and sidewall support when running flat or at low pressures are improved;

wherein each of said blocks of said first series of blocks comprises a base fixed to the associated side wall, a top, a first pair of circumferentially spaced and axially extending side surfaces between said base and top, and a second pair of radially spaced and axially extending side surfaces between said base and top; and wherein said second pair of side surfaces axially extend from said base at an acute angle thereby providing first sloping surfaces, wherein said radial overlap between said first and second series of blocks is not greater than the radial dimension of one of said second pair of surfaces.

2. The tire of claim 1 wherein said first series of blocks have equally spaced circumferential intervals.

3. The tire of claim 1 wherein said acute angle of each second pair of surfaces is between 20 and 40 degrees.

4. The tire of claim 1 wherein said first series of blocks and said second series of blocks comprises a block that has a quadrilateral base and a quadrilateral top.

5. The tire of claim 1 wherein said first pair of side surfaces axially extend from said base to said top at an acute angle thereby providing second sloping surfaces.

6. The tire of claim 5 wherein said top includes a cap portion.

7. The tire of claim 6 wherein said cap portion has faces each extending axially inward from a face surface generally parallel to the surface of the sidewall and terminating at upper edges of said first and second sloping surfaces between said top and said base.

8. The tire of claim 7 wherein said cap portion has four faces.

9. The tire of claim 5 wherein said first sloping surfaces terminate at a third pair of radially spaced and axially extending side surfaces.

10. The tire of claim 9 wherein said third pair of side surfaces extend to said top.

11. The tire of claim 10 wherein said third pair of side surfaces axially extend perpendicular from said top.

12. The tire of claim 10 wherein said third pair of side surfaces axially extend at an angle from said top.

13. The tire of claim 9 wherein said top includes a cap portion.

14. The tire of claim 13 wherein said cap portion has faces each extending axially inward and terminating at intermediate points between said top and said base.

15. The tire of claim 14 wherein said faces terminate at respective upper edges of said second and third sloping surfaces.

16. The tire of claim 1, further comprising a third series of circumferentially spaced blocks fixed to each of said sidewalls defining a third ring in concentric relation to said tire, and a fourth series of circumferentially spaced blocks fixed to each of said sidewalls defining a fourth ring in concentric relation to said tire.

17. The tire of claim 16 wherein each of said rings radially overlaps another of said concentric rings.

* * * * *